(12) United States Patent
Moore

(10) Patent No.: US 9,282,189 B2
(45) Date of Patent: *Mar. 8, 2016

(54) METHODS, SYSTEMS, AND PRODUCTS FOR NOTIFICATIONS

(71) Applicant: AT&T Intellectual Property I, L.P., Atlanta, GA (US)

(72) Inventor: Darryl Cynthia Moore, Social Circle, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/334,727

(22) Filed: Jul. 18, 2014

(65) Prior Publication Data
US 2014/0329505 A1 Nov. 6, 2014

Related U.S. Application Data

(63) Continuation of application No. 13/170,224, filed on Jun. 28, 2011, now Pat. No. 8,824,644, which is a continuation of application No. 11/707,805, filed on Feb. 16, 2007, now Pat. No. 7,995,720.

(51) Int. Cl.
| | | |
|---|---|---|
| *H04M 1/64* | (2006.01) | |
| *H04M 3/537* | (2006.01) | |
| *H04M 3/533* | (2006.01) | |
| *H04W 4/02* | (2009.01) | |
| *H04M 3/42* | (2006.01) | |

(52) U.S. Cl.
CPC .......... *H04M 3/537* (2013.01); *H04M 3/53333* (2013.01); *H04W 4/02* (2013.01); *H04M 2203/2083* (2013.01)

(58) Field of Classification Search
CPC .............. H04M 3/42042; H04M 3/42102; H04M 3/42348; H04M 3/42357; H04M 3/533; H04W 4/02
USPC ............... 379/88.01–88.19; 455/414.1–417
See application file for complete search history.

(56) References Cited

U.S. PATENT DOCUMENTS

| | | | |
|---|---|---|---|
| 5,276,679 | A | 1/1994 | McKay et al. |
| 6,018,571 | A | 1/2000 | Langlois et al. |
| 6,192,118 | B1 | 2/2001 | Bayless et al. |
| 6,333,973 | B1 | 12/2001 | Smith et al. |
| 6,535,590 | B2 | 3/2003 | Tidwell et al. |
| 6,738,462 | B1 | 5/2004 | Brunson |
| 6,898,709 | B1 | 5/2005 | Teppler |
| 6,917,610 | B1 | 7/2005 | Kung et al. |
| 6,999,566 | B1 * | 2/2006 | Eason ............... H04M 3/53366 379/88.12 |
| 7,424,099 | B2 | 9/2008 | Roberts et al. |
| 7,580,719 | B2 | 8/2009 | Karmarkar |
| 8,218,736 | B1 | 7/2012 | McClintock et al. |
| 2004/0054731 | A1 * | 3/2004 | Carter ................ G06Q 10/107 709/206 |
| 2004/0137884 | A1 | 7/2004 | Engstrom et al. |
| 2005/0074109 | A1 | 4/2005 | Hanson et al. |
| 2005/0111631 | A1 * | 5/2005 | Jordan ............... H04L 12/5835 379/88.12 |
| 2005/0186944 | A1 | 8/2005 | True et al. |

(Continued)

Primary Examiner — Solomon Bezuayehu
(74) Attorney, Agent, or Firm — Scott P. Zimmerman, PLLC

(57) ABSTRACT

A voicemail notification indicates a caller has recorded a voicemail. The voicemail notification may be sent to any destination, such as a caller's device. The voicemail notification may be displayed in a communication log to visually indicate that the voicemail was recorded. A different notification may be sent and displayed to indicates the recipient retrieved the voicemail.

20 Claims, 11 Drawing Sheets

(56) References Cited

U.S. PATENT DOCUMENTS

| | | |
|---|---|---|
| 2005/0283368 A1 | 12/2005 | Leung |
| 2006/0002536 A1 | 1/2006 | Ambrose et al. |
| 2006/0062205 A1 | 3/2006 | Doherty et al. |
| 2006/0077957 A1 | 4/2006 | Reddy et al. |
| 2006/0234693 A1 | 10/2006 | Isidore et al. |
| 2006/0291629 A1* | 12/2006 | Esh ............... H04M 3/42357 379/67.1 |
| 2007/0129060 A1 | 6/2007 | Jordan, Jr. |
| 2007/0223661 A1 | 9/2007 | Baker |
| 2007/0239898 A1 | 10/2007 | Friend et al. |
| 2007/0265838 A1 | 11/2007 | Chopra |
| 2007/0280457 A1 | 12/2007 | Aberethy et al. |
| 2007/0298758 A1* | 12/2007 | Verma ............... G08B 27/006 455/404.1 |
| 2008/0052341 A1 | 2/2008 | Goggin |
| 2008/0155026 A1 | 6/2008 | Daniels-Farrar et al. |
| 2008/0200152 A1 | 8/2008 | Moore |
| 2009/0037537 A1 | 2/2009 | Callanan et al. |
| 2009/0112664 A1 | 4/2009 | Sprogis et al. |
| 2012/0042011 A1 | 2/2012 | Vendrow et al. |

* cited by examiner

FIG. 3A

| | Date & Time of Recording | Recipient |
|---|---|---|
| ▷ | | |
| 🎙 | January 3, 2007 at 3:15 PM EST | (123)555-1997<br>Mrs. Jones |
| 🎙 | January 2, 2007 at 8:21 PM EST | smith@isp.com<br>Username "Bob" |
| ◁ | | |

| | Date & Time of Retrieval | Date & Time of Recording | Recipient |
|---|---|---|---|
| ▷ | | | |
| 📢 | January 3, 2007 at 6:42 PM EST | January 3, 2007 at 3:15 PM EST | (123)555-1997<br>Mrs. Jones |
| 🎙 | Not Retrieved | January 2, 2007 at 8:21 PM EST | smith@isp.com<br>Username "Bob" |
| ◁ | | | |

50, 54, 58, 84, 86

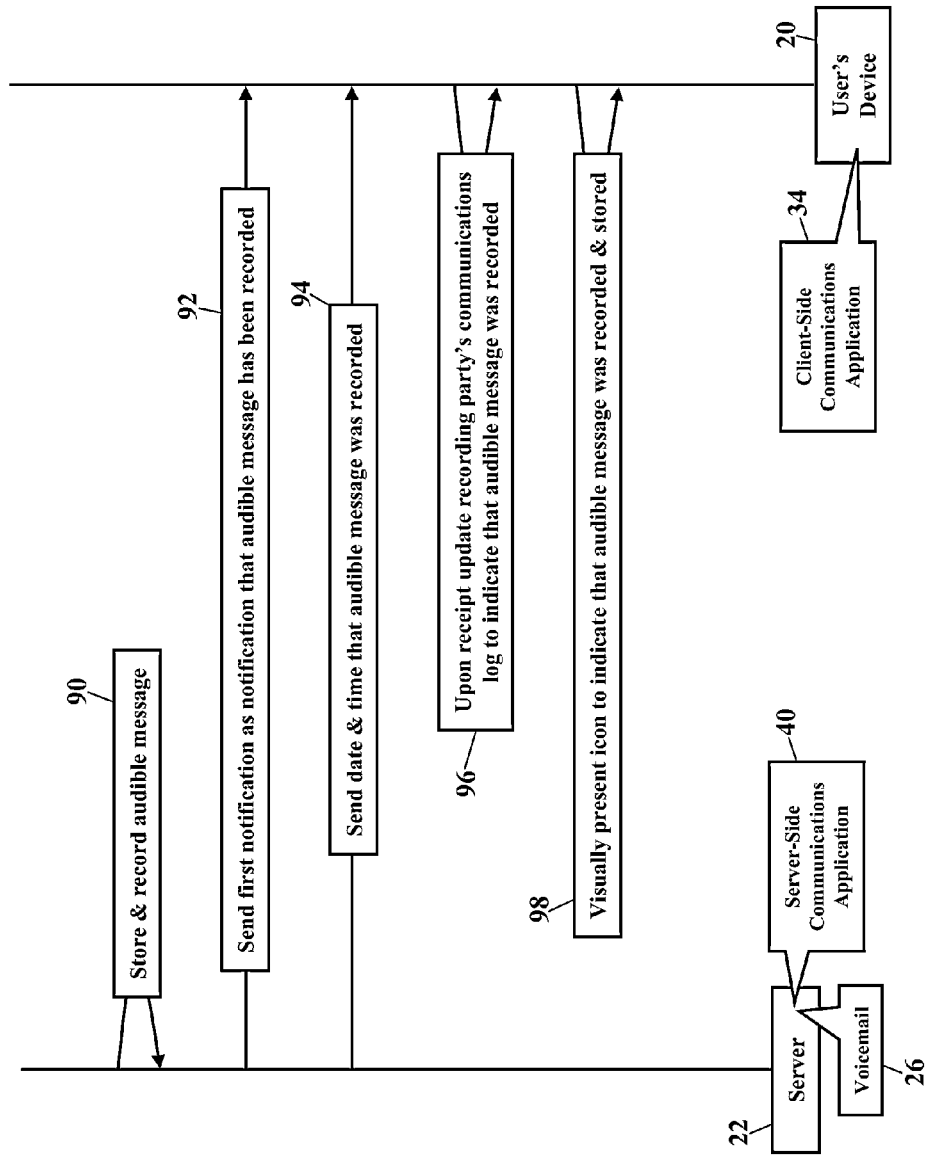

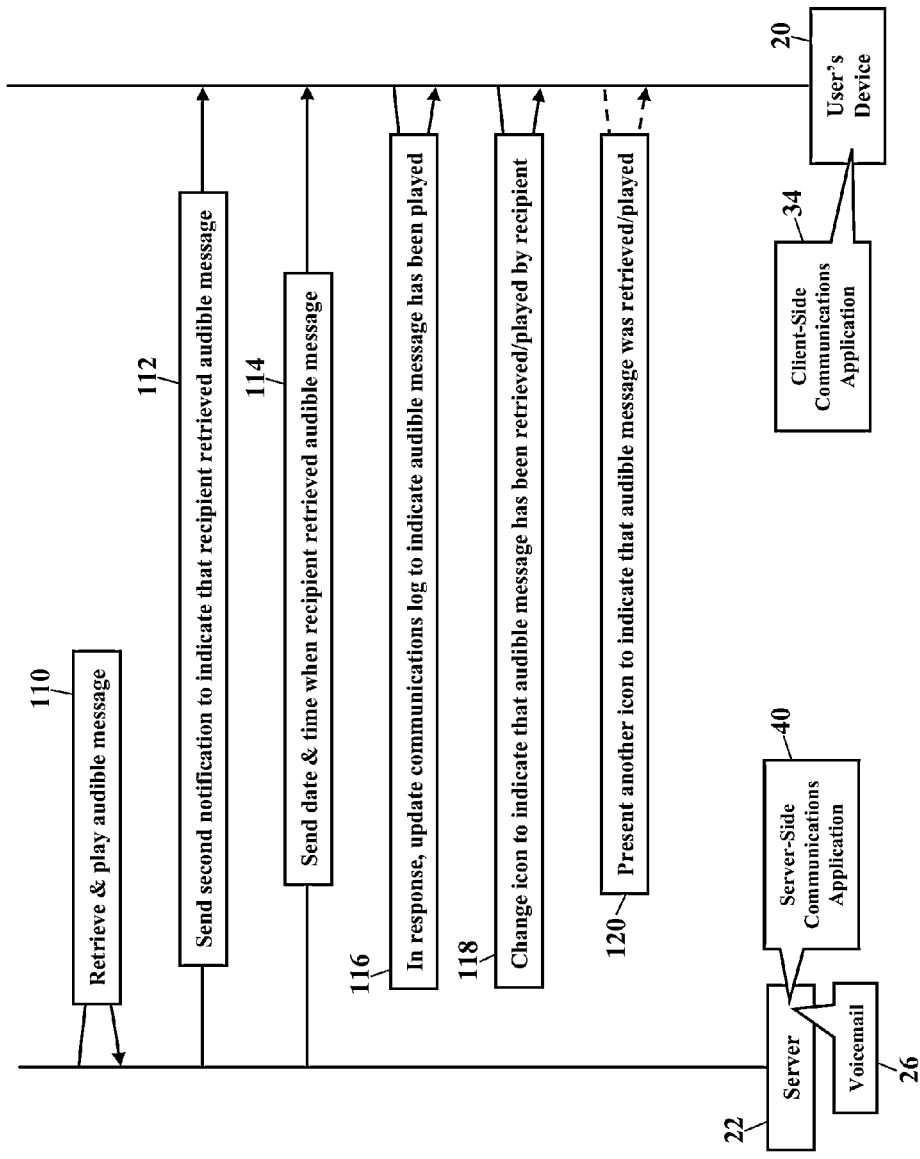

METHODS, SYSTEMS, AND PRODUCTS FOR NOTIFICATIONS

CROSS-REFERENCE TO RELATED APPLICATIONS

This application is a continuation of U.S. application Ser. No. 13/170,224 filed Jun. 28, 2011 and since issued as U.S. Pat. No. 8,824,644, which is a continuation of U.S. application Ser. No. 11/707,805 filed Feb. 16, 2007 and since issued as U.S. Pat. No. 7,995,720, with both applications incorporated herein by reference in their entireties.

BACKGROUND

The exemplary embodiments generally relate to communications and to data processing and, more particularly, to voicemail and to message notifications.

Voicemail notifications are needed. When users send emails, notifications may be sent to alert of events or activities. When the email recipient reads the email, for example, a "read receipt" may be sent to alert the sender. When voicemails are recorded and played, however, no such notifications currently exist. What is needed, then, are methods, systems, and products for providing voicemail notifications.

SUMMARY

Exemplary embodiments provide methods, systems, and products for notifications. These notifications provide alerts of audible messages, such as voicemails. When a recipient of a voicemail retrieves, plays, or otherwise accesses a voicemail, a notification may be sent. The notification communicates to the sender or recorder of the voicemail. The notification informs the recording party of when the recipient retrieves or listens to the voicemail. Exemplary embodiments may even notify the sender of the recipient's physical location at which the voicemail was retrieved. Exemplary embodiments even permit the sender/recorder to retrieve and playback the voicemail.

Exemplary embodiments include a method for voicemail notifications. A first notification is received that indicates a caller has recorded a voicemail. In response to the first notification, the caller's communication log is updated to indicate that the voicemail was recorded. A second notification is received that indicates the recipient retrieved the voicemail. In response to the second notification, the caller's communication log is updated to indicate that the voicemail has been played. When the recipient listens to the voicemail, the communication log thus informs the caller.

More exemplary embodiments include a system for voicemail notifications. A first notification is received that indicates a caller has recorded a voicemail. In response to the first notification, the caller's communication log is updated to indicate that the voicemail was recorded. A second notification is received that indicates the recipient retrieved the voicemail. In response to the second notification, the caller's communication log is updated to indicate that the voicemail has been played. When the recipient listens to the voicemail, the communication log thus informs the caller.

Other exemplary embodiments describe a computer program product for providing voicemail notifications. The computer program product stores instructions for receiving a first notification that indicates a caller has recorded a voicemail. In response to the first notification, the caller's communication log is updated to indicate that the voicemail was recorded. A second notification is received that indicates the recipient retrieved the voicemail. In response to the second notification, the caller's communication log is updated to indicate that the voicemail has been played. When the recipient listens to the voicemail, the communication log thus informs the caller.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIGS. 3A and 3B are schematics illustrating a communications log, according to even more exemplary embodiments;

FIGS. 4-6 are schematics illustrating another process for providing notifications, according to still more exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
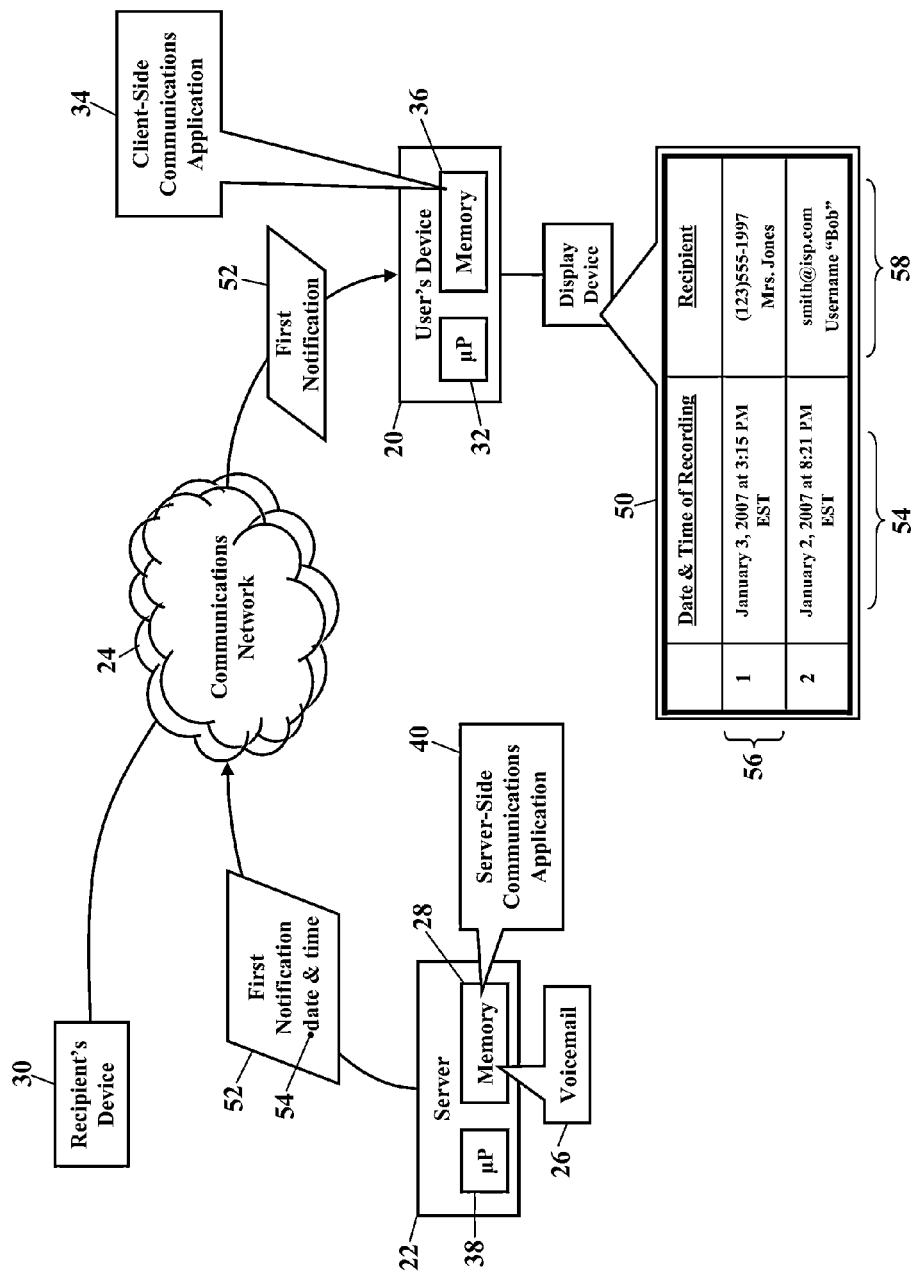
FIG. 1 is a schematic illustrating an environment in which exemplary embodiments may be implemented.

FIG. 1 is a schematic illustrating an environment in which exemplary embodiments may be implemented. A user's device 20 communicates with a server 22 via a communications network 24. When the user records a voicemail 26, the voicemail 26 may be stored in memory 28 of the server 24. The voicemail 26 is associated with a recipient (such as a called party), such that the recipient may retrieve the voicemail 26 using a recipient's device 30. According to exemplary embodiments, the user's device 20 has a processor 32 (e.g., "µP"), application specific integrated circuit (ASIC), or other similar device that executes a client-side communications application 34 stored in memory 36. The server 22 also has a server-side processor 38 (e.g., "µP"), application specific integrated circuit (ASIC), or other similar device that executes a server-side communications application 40 stored in the memory 28. According to exemplary embodiments, the client-side communications application 34 and the server-side communications application 40 cooperate to inform the user's device 20 of when the recipient listens to the voicemail 26.

The client-side communications application 34 may update the user's communications log 50. The communications log 50 monitors or tracks some or all communications sent and/or received by the user. The communications log 50 is illustrated as being stored in the memory 36 of the user's device 20, but the communications log 50 may be remotely accessible via the communications network 24. The communications log 50, in particular, may indicate that the user recorded the voicemail 26 for the recipient. As FIG. 1 illustrates, when the user records the voicemail 26 to the memory 28 of the server 24, the server-side communications application 40 causes the server-side processor 38 to send a first notification 52. The first notification 52 may communicate to the user's device 20 via the communications network 24. The first notification 52 indicates that the user has recorded the voicemail 26. The first notification 52 may also include information that indicates a date and time 54 that the voicemail 26 was recorded. When the user's device 20 receives the first notification 52, the client-side communications application 34 may update the communications log 50 to indicate that the user recorded the voicemail 26.

FIG. 1 illustrates an entry 56 in the user's communications log 50. The communications log 50 is illustrated as being visually presented on a display device, but the communications log 50 may have features for audible presentation. Here the entry 56 indicates that the user recorded the voicemail 26 for the recipient. The entry 56 may include a data field that identifies the date and the time 54 that the voicemail 26 was recorded. The entry 56 may also identify a recipient 58 of the voicemail 26, such as by the recipient's name, the recipient's telephone number, the recipient's email address, or any other communications address associated with the recipient. According to exemplary embodiments, the communications applications 34 and 40 thus comprise processor-executable instructions that present the communications log 50. The communications applications 34 and 40 are thus software engines that inform the user, via the user's communications log 50, of when the user records voicemails for other parties.

Exemplary embodiments also permit archival storage of the voicemail 26. As FIG. 1 illustrates, the voicemail 26 is stored in memory 28 of the server 22 for the recipient to retrieve. Exemplary embodiments, however, may additionally archive or store the voicemail 26 in the user's device 20. That is, the server-side communications application 40 may communicate the voicemail 26 via the communications network 24, thus "mirroring" the voicemail 26 to the memory 36 of the user's device 20. The recorder/sender may even configure the server-side communications application 40 to communicate and store the voicemail 26 to any destination in the communications network 24. The voicemail 26, for example, may be formatted and stored as a .wav file, although exemplary embodiments may utilize any other formatting. However and wherever the voicemail 26 is archived, exemplary embodiments may permit the recording user to access and review the recorded voicemail 26.

The user's device 20 and the server 22 are only simply illustrated. Because their architecture and operating principles are well known, their hardware and software components are not further shown and described. If the reader desires more details, the reader is invited to consult the following sources, all incorporated herein by reference in their entirety: ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Some aspects of voicemail and of communications logs are known, so this disclosure will not greatly explain the known details. If the reader desires more details, the reader is invited to consult the following sources, all incorporated herein by reference in their entirety: U.S. Pat. No. 6,018,571 to Langlois et al.; U.S. Pat. No. 6,192,118 to Bayless et al.; U.S. Pat. No. 6,333,973 to Smith et al.; U.S. Pat. No. 6,535,590 to Tidwell et al.; U.S. Pat. No. 6,917,610 to Kung et al; U.S. Patent Application Publication 2004/0137884 to Engstrom et al.; U.S. Patent Application Publication 2005/0074109 to Hanson et al.; U.S. Patent Application Publication 2005/0111631 to Jordan; U.S. Patent Application Publication 2006/0002536 to Ambrose; U.S. Patent Application Publication 2006/0062205 to Doherty et al.; U.S. Patent Application Publication 2006/0077957 to Reddy et al.; and U.S. Patent Application Publication 2006/0234693 to Isidore et al.

Figure 2:
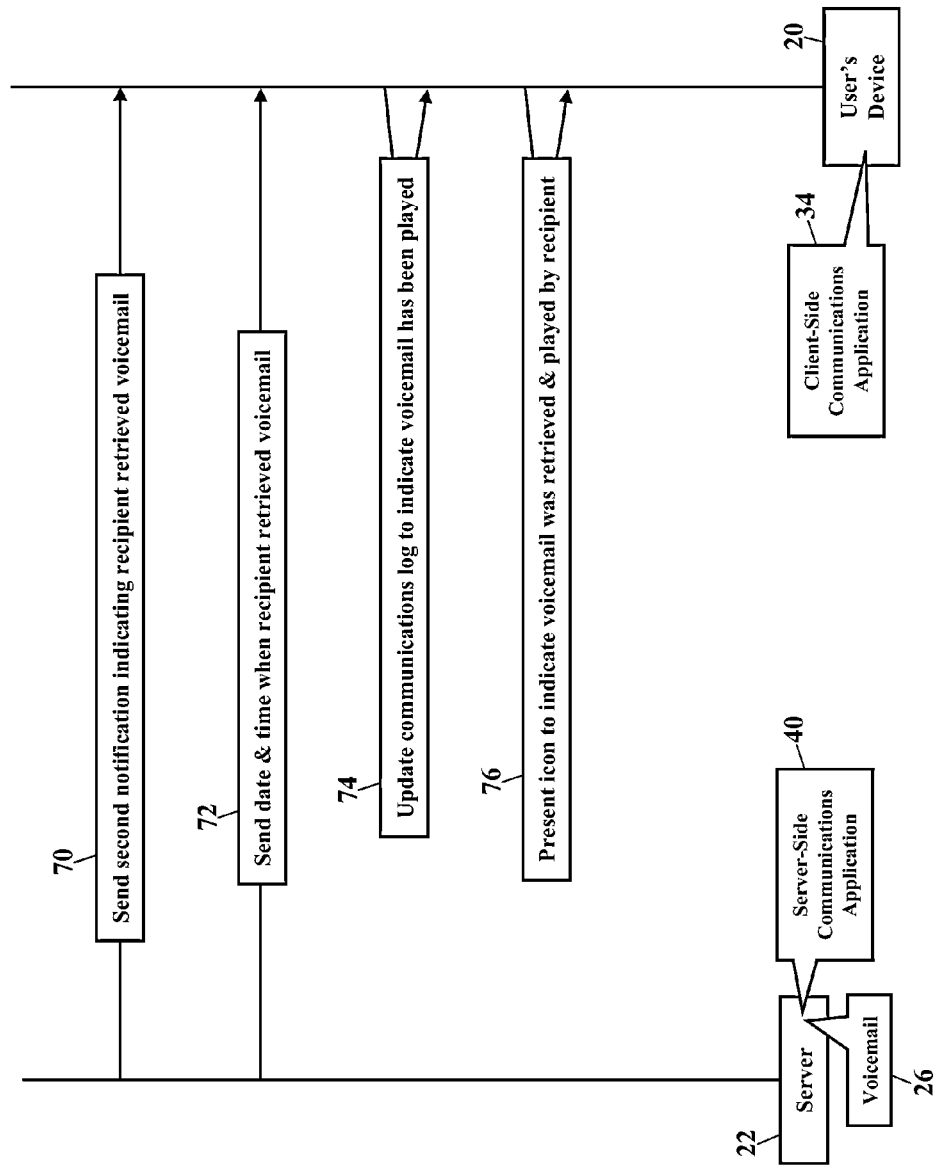
FIG. 2 is a schematic illustrating a process for providing additional notifications, according to more exemplary embodiments.

FIG. 2 is a schematic illustrating a process for providing additional notifications, according to more exemplary embodiments. Here, when the recipient retrieves or listens to the voicemail 26, the user may be so informed. When the recipient (e.g., the called party and/or voicemail recipient) retrieves, reviews, downloads, listens to, or otherwise accesses the voicemail 26 stored in the server 22, the server-side communications application 40 may send a second notification (Step 70). The second notification includes information indicating the recipient retrieved the voicemail 26. The server-side communications application 40 may also send information indicating the date and time 54 when the recipient retrieved the voicemail 26 (Step 72). In response to receipt of the second notification, the client-side communications application 34 updates the user's communications log 50 to indicate that the voicemail 26 has been played (Step 74). The client-side communications application 34 may cause visual presentation of an icon in the communications log 50 to indicate that the voicemail was retrieved and played by the recipient (Step 76). When the recipient listens to the voicemail 26, the communications log 50 thus informs the user (e.g., the sender or recorder of the voicemail).

Exemplary embodiments, however, may not send the second notification (e.g., Step 70). When the recipient retrieves, plays, or listens to the voicemail 26, the server-side communications application 40 may be prevented from sending the date and time 54 that the recipient retrieved the voicemail 26. The recipient, for example, may configure the server-side communications application 40 to never send, or to "block," the second notification. The recipient, in other words, may not want the server-side communications application 40 to notify the client-side communications application 34 of when the voicemail 26 has been played. The recipient may optionally configure the server-side communications application 40 to prompt before sending the second notification. When the recipient retrieves the voicemail 26, the server-side communications application 40 may be configured to send a message to the recipient's retrieving device 30. The message creates or produces a visual and/or audible prompt at the recipient's retrieving device. When the recipient wishes to update the sender's communications log 50, the recipient affirmatively responds to the prompt. The recipient's retrieving device then sends an affirmative response to the server-side communications application 40. The affirmative response authorizes the server-side communications application 40 to send the second notification (e.g., Step 70). In response to receipt of the second notification, the client-side communications application 34 updates the user's communications log 50 to indicate that the voicemail 26 has been played (e.g., Step 74).

Exemplary embodiments may also permit changing a status of messages. After the recipient retrieves, reads, plays, or listens to a message (such as the voicemail 26), the recipient may instruct the server-side communications application 40 to maintain, or reset, a "new" message status. When the voicemail message 26 is played, for example, ordinarily the server-side communications application 40 may change the voicemail's status from "new" to "old" or "stored." The recipient, however, may indicate that the voicemail 26 should be maintained as "new" and unread or not retrieved. The recipient, for example, may wish to keep the voicemail 26 queued with new messages as an audible reminder. Because the voicemail 26 may be repeatedly returned to a top of the voicemail queue, the recipient would hear the voicemail each time the queue is accessed.

Exemplary embodiments may also inform the sender of deleted messages. When the recipient deletes a message, the server-side communications application 40 may be configured to send a message informing the sender of that deletion. The sender's communications log 50 may even present a deletion icon to provide a visual notification. When, for example, the recipient deletes the voicemail 26 (even without listening/playing the voicemail 26), the server-side communications application 40 may be configured to so inform the client-side communications application 34. The sending user is thus informed of when the recipient ignores and deletes the voicemail 26. Sales and marketing personnel, for example, would immediately know that their voicemail 26 was ignored.

Exemplary embodiments also permit duplicate voicemails. Because the voicemail 26 may be archived/stored in the user's device 20 (and/or at any destination the user desires, as above explained), the sending user may retrieve and resend the same voicemail 26. The user, for example, may resend to emphasize the importance of the voicemail 26. Even if the recipient retrieved and played the originally-sent voicemail 26, a second send of the same voicemail 26 further reinforces the content of the voicemail 26. When the recipient deletes the voicemail 26, the user may wish to resend another, duplicate copy. The user may even wish to send duplicate copies of the same voicemail 26, regardless of whether the originally-sent voicemail 26 has been retrieved and played by the recipient.

FIGS. 3A and 3B are schematics further illustrating the communications log 50, according to even more exemplary embodiments. As FIG. 3A illustrates, the communications log 50 indicates that two (2) voicemails have been recorded by the user. According to exemplary embodiments, the communications log 50 presents the date and the time 54 that each voicemail was recorded, and the communications log 50 also indicates the recipient 58 of each recorded voicemail. As FIG. 3A also illustrates, the communications log 50 may display a recording icon 80 for each recorded voicemail. The recording icon 80 visually indicates that a voicemail was recorded. Scrolling controls 82 allow the user to scroll up and down within the communications log 50 to select any entry.

FIG. 3B illustrates retrieval of a voicemail. When a recipient retrieves, plays, or listens to a voicemail, the communications log 50 may include a date field that indicates the date and time 84 of retrieval. The communications log 50 changes to present a retrieval icon 86 to indicate the voicemail was retrieved and played by the recipient.

Figure 6:
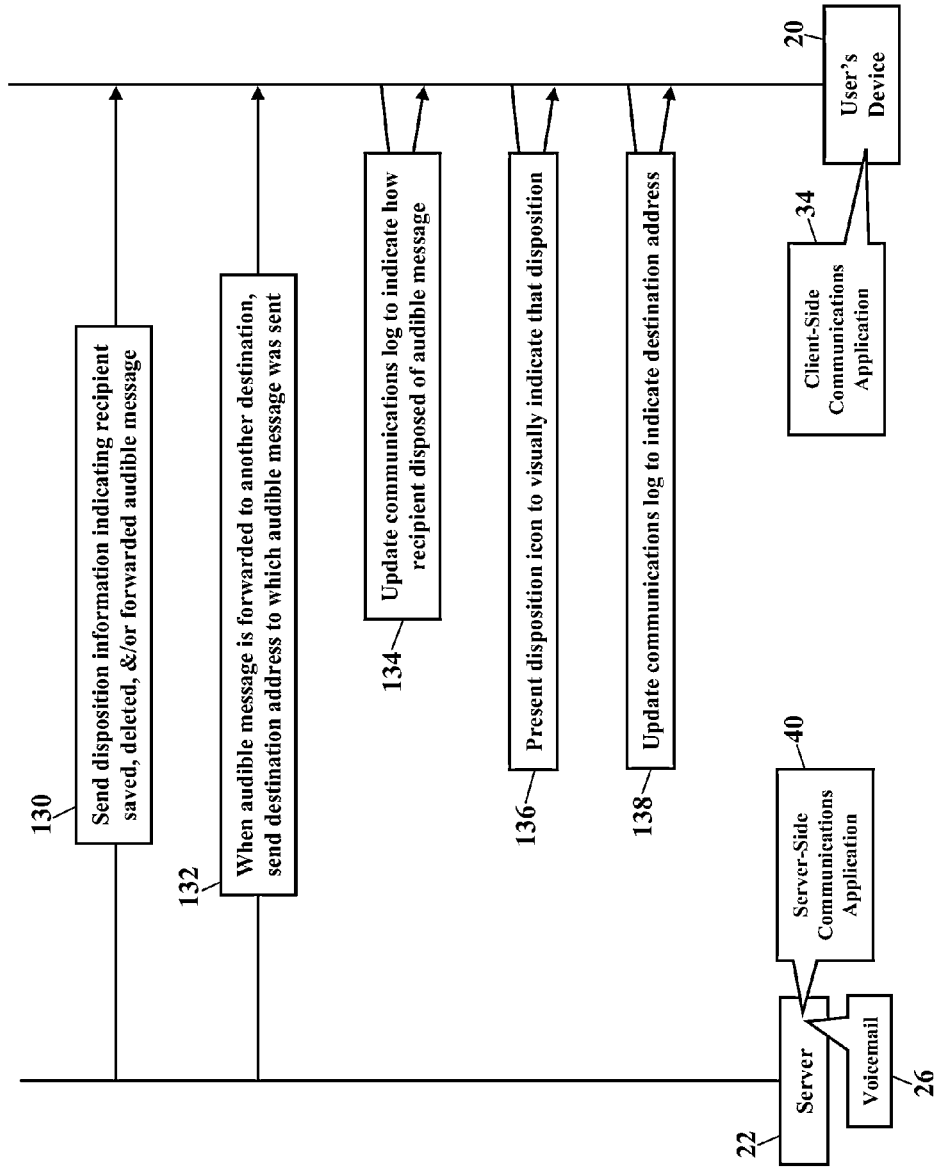

FIGS. 4-6 are schematics illustrating another process for providing notifications, according to still more exemplary embodiments. An audible message (such as the voicemail 26) is recorded and stored (Step 90). The first notification 52 is sent to notify the recording party (e.g., the caller) that the audible message has been recorded (Step 92). The date and time 54 that the audible message was recorded may also be sent (Step 94). Upon receipt of the first notification, the client-side communications application 34 updates the recording party's communications log 50 to indicate that the recording party recorded the audible message (Step 96). An icon may be visually presented in the communications log 50 to indicate that the audible message was recorded and stored (Step 98).

The process continues with FIG. 5. The audible message is retrieved and played (Step 110). The server-side communications application 40 sends the second notification to indicate that the recipient retrieved the audible message (Step 112). The server-side communications application 40 may also send information indicating the date and time 54 when the recipient retrieved the audible message (Step 114). In response to receipt of the second notification, the client-side communications application 34 updates the communications log 50 to indicate that the audible message has been played (Step 116). The icon in the communications log 50 may be changed to indicate that the audible message has been retrieved/played by the recipient (Step 118). Another icon, additionally or alternatively, may be visually presented in the communications log 50 to indicate that the audible message was retrieved and played by the recipient (Step 120).

The process continues with FIG. 6. The disposition of the audible message may also be indicated. When the recipient retrieves and/or listens to the audible message, the recipient usually disposes of that audible message. The recipient, for example, may listen to the audible message and then delete the message. The recipient may save or archive the audible message. The recipient may even send or "forward" the audible message to another party or alternate destination. When the recipient disposes of the audible message, the server-side communications application 40 may also send disposition information indicating the recipient at least one of saved, deleted, and forwarded the audible message (Step 130). If the audible message was forwarded to another destination, the server-side communications application 40 may also send the destination address to which the audible message was sent (Step 132). When the disposition information is received, the client-side communications application 34 updates the communications log 50 to indicate how the recipient disposed of the audible message (Step 134). A disposition icon may be presented to visually indicate that disposition (Step 136). The client-side communications application 34 may update the communications log 50 to indicate the destination address to which the audible message was forwarded (Step 138). The communications log 50 thus visually indicates how the recipient disposed of the audible message and to whom the message was forwarded.

Figure 7:
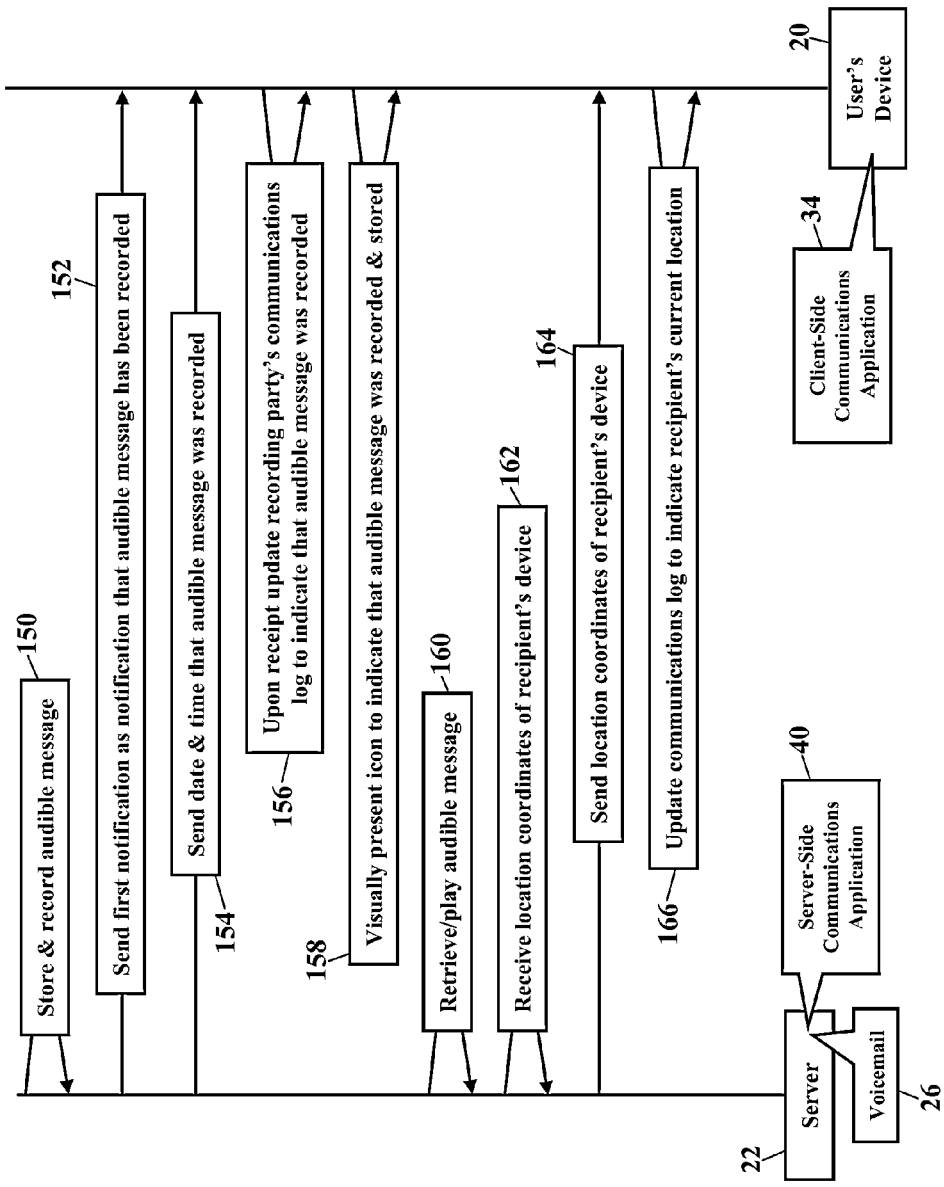
FIG. 7 is a schematic illustrating another process for providing notifications, according to still more exemplary embodiments.

FIG. 7 is a schematic illustrating another process for providing notifications, according to still more exemplary embodiments. When the recipient retrieves and/or listens to the audible message, here exemplary embodiments provide the physical location of the recipient. The audible message is recorded and stored (Step 150), and the first notification 52 is sent (Step 152). The date and time 54 that the audible message was recorded may also be sent (Step 154). The recording party's communications log 50 is updated to indicate that the audible message was recorded (Step 156). An icon may be visually presented to indicate the audible message was recorded and stored (Step 158).

The recipient's location may also be reported. When the recipient retrieves and/or plays the audible message (Step 160), the server-side communications application 40 may receive the location coordinates of the recipient's retrieving device (illustrated as reference numeral 30 in FIG. 1) (Step 162). The location coordinates describe the current location associated with the recipient's device. The recipient's location coordinates are sent (Step 164) and the recording party's communications log 50 is updated to indicate the location at which the recipient is currently located (Step 166). Exemplary embodiments thus inform the caller/recorded/sender of the recipient's current location.

Figure 8:
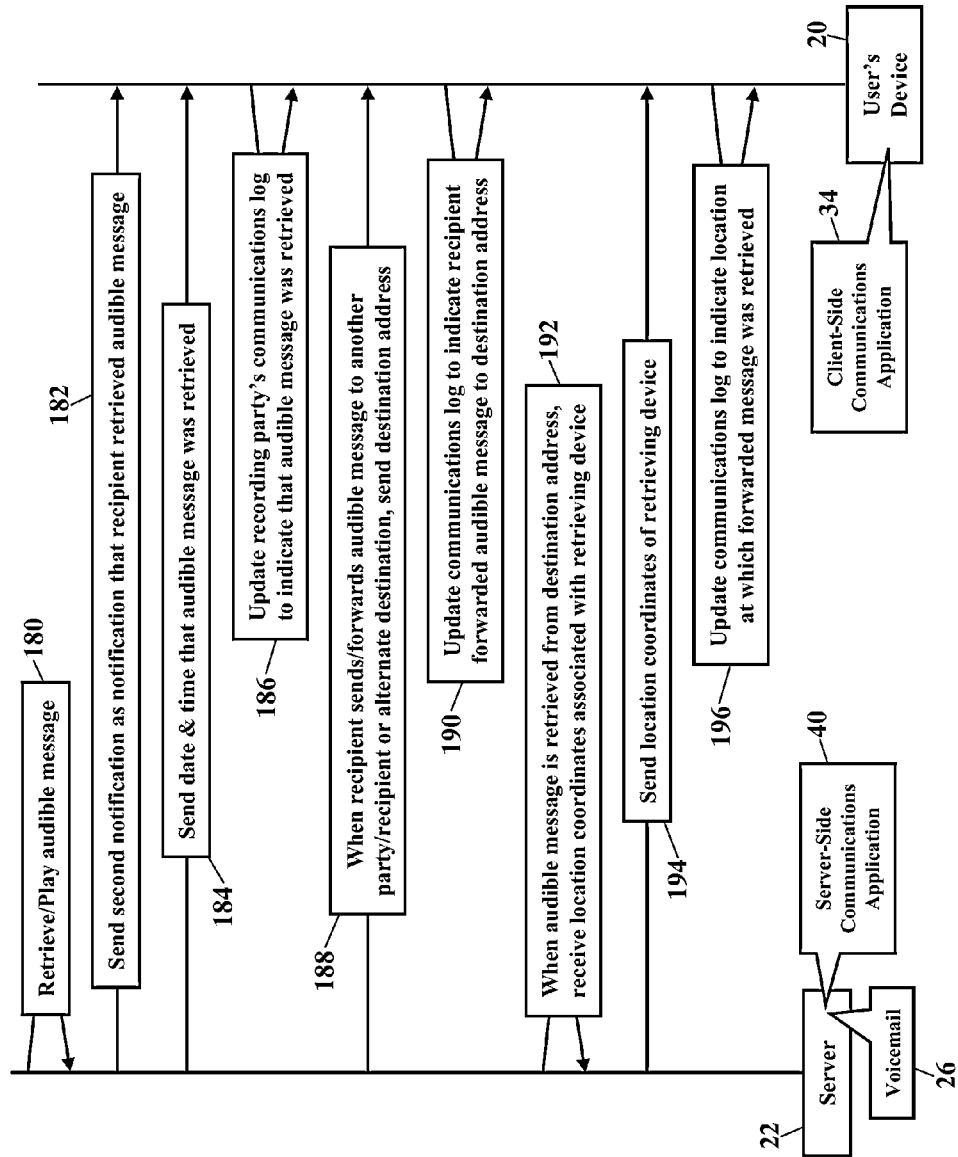
FIG. 8 is a schematic illustrating another process for providing notifications, according to more exemplary embodiments.

FIG. 8 is a schematic illustrating another process for providing notifications, according to more exemplary embodiments. Here, when the audible message is forwarded to another destination, exemplary embodiments report the physical location of that alternate destination. When the recipient retrieves/plays the audible message (Step 180), the second notification is sent to indicate that the recipient retrieved the audible message (Step 182). The date and time when the recipient retrieved the audible message is sent (Step 184). The communications log 50 is updated to indicate that the recipient retrieved/played the audible message (Step 186).

The disposition of the audible message is also reported. Here, when the recipient sends or forwards the audible message to another party/recipient or alternate destination, the destination address (to which the audible message was forwarded) is sent (Step 188). The communications log 50 is updated to indicate that the recipient forwarded the audible message to another destination address (Step 190).

Additional locations may be reported. Because the recipient forwarded the audible message to another destination address, exemplary embodiments may report the physical location of the device retrieving the forwarded message. When the audible message is retrieved from the destination address, the server-side communications application 40 may receive the location coordinates associated with the retrieving device (that is used to retrieve the forwarded message) (Step 192). The location coordinates describe the current location associated with the device that retrieves the forwarded audible message. The location coordinates are sent (Step 194) and the recording party's communications log 50 is updated to indicate the location at which the forwarded message was retrieved (Step 196).

An example is provided. Suppose a first party (e.g., the caller) records a voicemail for a second party (e.g., the recipient or the called party). When the second party retrieves and listens to the voicemail, the second party forwards the voicemail to a third party recipient. The voicemail is thus stored in a message database associated with the third party. When the third party's device retrieves the voicemail, the location coordinates associated with the third party's device are reported or sent to the server-side communications application 40 (operating in the server 22). The server 22 then sends those location coordinates to the first party's device 20. The communications log 50 is thus updated with the location coordinates of the third party recipient.

Figure 9:
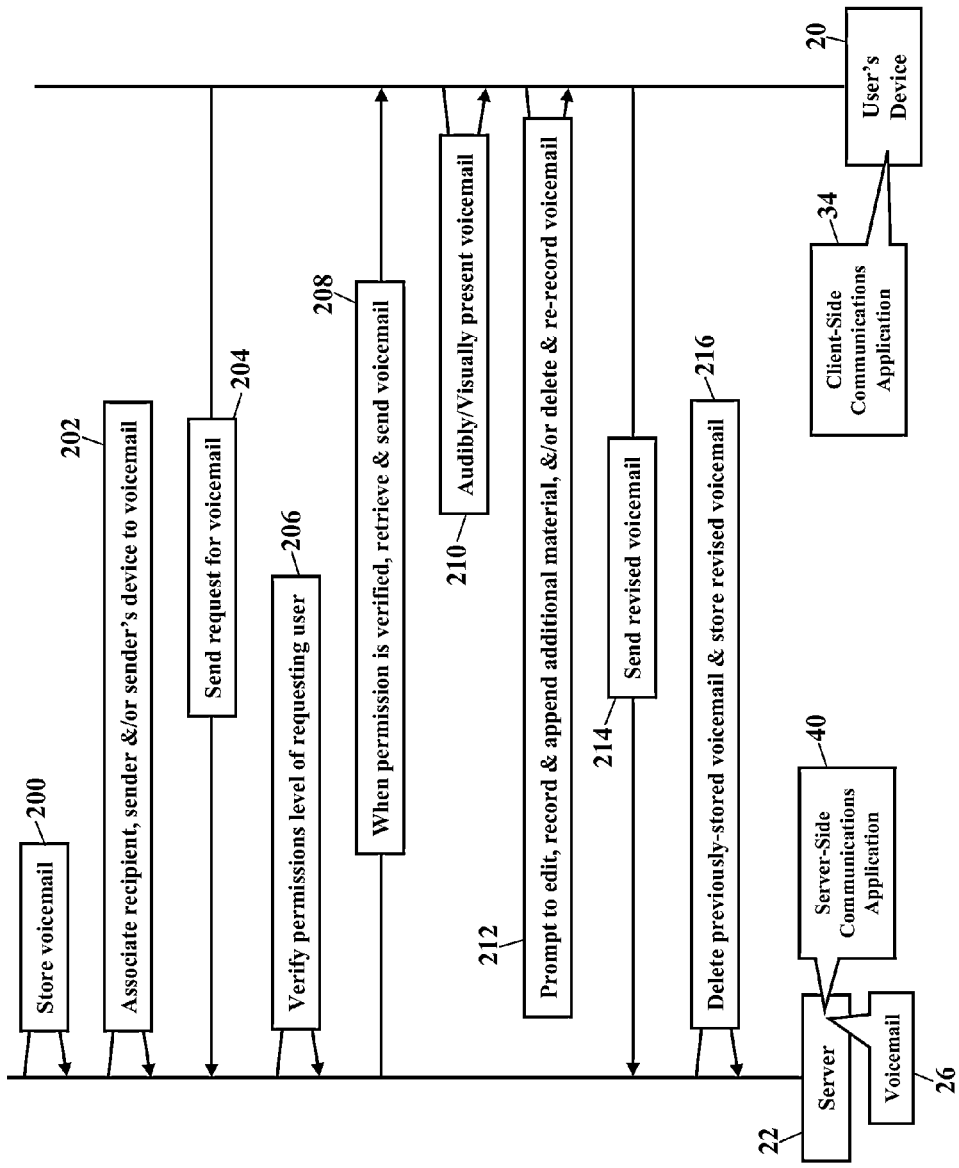
FIG. 9 is a schematic illustrating a process for retrieval and review of voicemails, according to still more exemplary embodiments.

FIG. 9 is a schematic illustrating a process for retrieval and review of voicemails, according to still more exemplary embodiments. Here, the recording party is permitted to retrieve, listen to, and even edit the recorded voicemail 26. When the user records the voicemail 26, the voicemail 26 is stored in memory 28 of the server 24 (Step 200). The server-side communications application 40 associates the recipient, and the recording user (and/or the user's device 20), to the voicemail 26 (Step 202). When the server-side communications application 40 is appropriately configured, the recording/sending user may have authority to retrieve and review the recorded voicemail 26. The recipient, for example, may configure the server-side communications application 40 with sender/recorder identities for whom review is permitted. The sending user may even configure, or demand, such permissions from the server-side communications application 40. Regardless, exemplary embodiments may permit the recording/sending user to select, or "click," the recording icon (illustrated as reference numeral 80 in FIG. 3A) associated with the recorded voicemail 26. The client-side communications application 34, in response, sends a request for the voicemail 26 (Step 204). The request identifies the desired voicemail 26 by filename, date/time, sender, recipient, or any combination of these parameters. When the server-side communications application 40 receives the request, the server-side communications application 40 verifies the permissions level of the requesting user (Step 206). If permission is verified, the server-side communications application 40 retrieves and sends the voicemail 26 (Step 208). The user's device 20 thus retrieves the voicemail 26 and the client-side communications application 34 may invoke some audio/video player to present the voicemail 26 (Step 210). Exemplary embodiments thus permit the recording user to obtain and playback the voicemail 26.

Exemplary embodiments may also permit editing of the voicemail 26. When the user's device 20 retrieves the voicemail 26, the client-side communications application 34 may permit the user to edit and/or to augment the voicemail 26. The client-side communications application 34, for example, may prompt the user to edit the voicemail 26, record and append additional material to the voicemail 26, and/or delete and re-record the voicemail 26 (Step 212). When the user chooses to edit the voicemail 26, for example, the user may be instructed to identify a portion of the voicemail 26 at which new material will be recorded for replacement. When the user chooses to record and append new material, that new material is appended to an end of the recorded voicemail 26. When the user chooses to delete and re-record, the client-side communications application 34 deletes the original voicemail file and records a new voicemail file. Regardless, once the user has completed the editing process, the client-side communications application 34 sends a revised voicemail (Step 214). When the server-side communications application 40 receives the revised voicemail, the server-side communications application 40 deletes the previously-stored voicemail 26 and, instead, stores the revised voicemail (Step 216). The revised voicemail is then queued for presentation to the recipient.

At any time, though, the revised voicemail may be denied. The server-side communications application 40 may configured with a set of rules for receiving and/or storing revised voicemails. If the recipient, for example, has already listened to, saved, or deleted the originally-recorded voicemail 26, then the server-side communications application 40 may be prevented from receiving/storing the revised voicemail. The recipient may also configure the server-side communications application 40 to deny any characteristic of a revised voicemail. The recipient, for example, may wish to deny any revised voicemail that is longer in time than the originally-recorded voicemail 26. When the revised voicemail exceeds some threshold time when compared to the originally-recorded voicemail 26, then the revised voicemail may be denied. The recipient may wish to deny any revised voicemail that has a different date than the originally-recorded voicemail 26. When the revised voicemail would be chronologically queued at a different position, the recipient may wish to deny the revised voicemail. The user, alternatively may specify that the revised voicemail be queued in the same chronological position as the originally-recorded voicemail 26.

Figure 10:
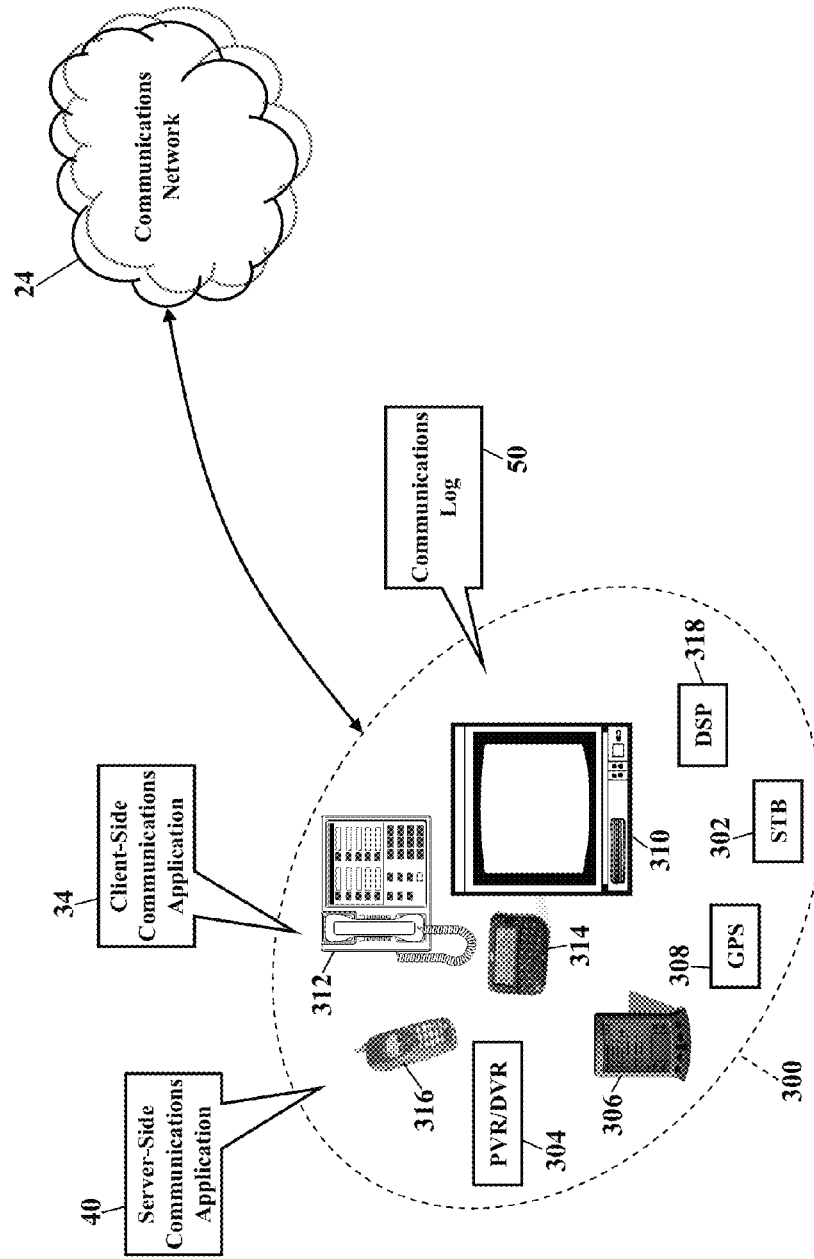
FIG. 10 depicts other possible operating environments for additional aspects of the exemplary embodiments.

FIG. 10 depicts other possible operating environments for additional aspects of the exemplary embodiments. FIG. 10 illustrates that the client-side communications application 34 and/or the server-side communications application 40 may alternatively or additionally operate within various other devices 300. FIG. 10, for example, illustrates that the client-side communications application 34 and/or the server-side communications application 40 may entirely or partially operate within a set-top box (302), a personal/digital video recorder (PVR/DVR) 304, personal digital assistant (PDA) 306, a Global Positioning System (GPS) device 308, an interactive television 310, an Internet Protocol (IP) phone 312, a pager 314, a cellular/satellite phone 316, or any computer system and/or communications device utilizing a digital signal processor (DSP) 318. The device 300 may also include watches, radios, vehicle electronics, clocks, printers, gateways, and other apparatuses and systems capable of presenting the communications log 50. Because the architecture and operating principles of the various devices 300 are well known, the hardware and software componentry of the various devices 200 are not further shown and described. If, however, the reader desires more details, the reader is invited to consult the following sources, all incorporated herein by reference in their entirety: LAWRENCE HARTE et al., GSM SUPER-PHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995 January))"; the GSM Standard 11.11, formally known as *Specification of the Subscriber Identity Module—Mobile Equipment (Subscriber Identity Module—ME) interface* (GSM 11.11 V5.3.0 (1996 July))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); EDWARD M. SCHWALB, iTV HANDBOOK: TECHNOLOGIES AND STANDARDS (2004); ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

Figure 11:
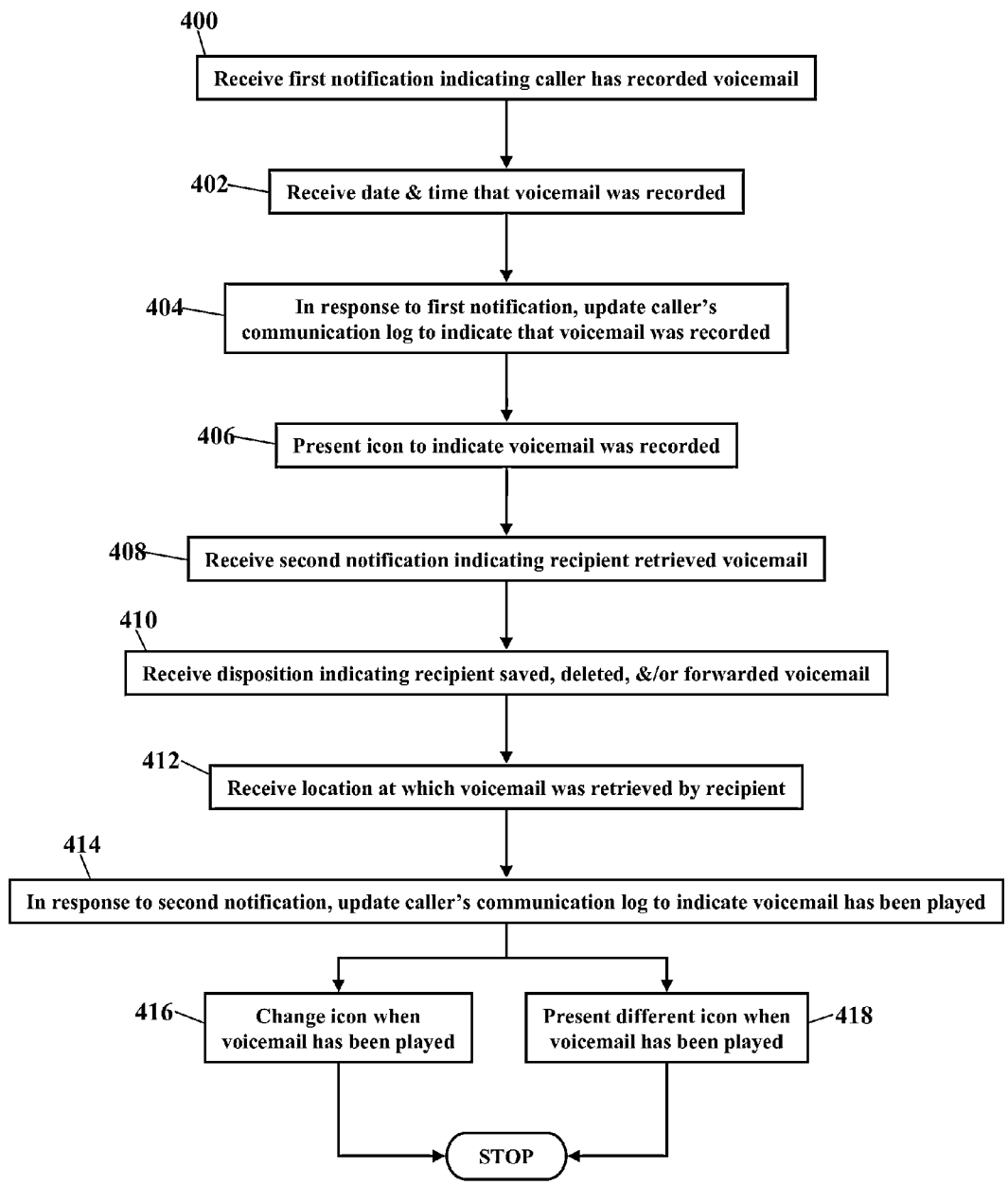
FIG. 11 is a flowchart illustrating a method of voicemail notification, according to exemplary embodiments.

FIG. 11 is a flowchart illustrating a method of voicemail notification, according to exemplary embodiments. A first notification is received indicating a caller has recorded a voicemail (Block 400). A date and time may be received that indicates when the voicemail was recorded (Block 402). In response to the first notification, the caller's communication log is updated to indicate that the voicemail was recorded (Block 404). An icon may be visually and/or audibly presented to indicate the voicemail was recorded (Block 406). A second notification is received indicating the recipient retrieved the voicemail (Block 408). A disposition may also be received that indicates the recipient at least one of saved, deleted, and forwarded the voicemail (Block 410). A location may also be received at which the voicemail was retrieved by the recipient (Block 412). In response to the second notification, the caller's communication log is updated to indicate that the voicemail has been played (Block 414). The icon may be changed when the voicemail has been played (Block 416) and/or a different icon may be presented to indicate the voicemail was retrieved and played (Block 418).

Exemplary embodiments may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments. A computer program product comprises processor-executable instructions for responding to communications.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
receiving, by a processor, an electronic notification indicating a device has retrieved a voicemail, the device identified by a network address;
receiving, by the processor, an electronic voicemail retrieval icon indicating the voicemail has been retrieved;
receiving, by the processor, global positioning system coordinates associated with the network address, the global positioning system coordinates describing a retrieval location at which the device retrieved the voicemail;
retrieving, by the processor, an electronic communications log associated with a calling address associated with the voicemail; and
adding, by the processor, an electronic entry to the electronic communications log associated with the calling address, the electronic entry associating the global positioning system coordinates describing the retrieval location to the network address associated with the device retrieving the voicemail and to the electronic voicemail retrieval icon.

2. The method of claim 1, further comprising sending the electronic voicemail retrieval icon to the calling address.

3. The method of claim 1, further comprising displaying the voicemail retrieval icon in the communications log to indicate the device retrieved the voicemail at the global positioning system coordinates describing the retrieval location.

4. The method of claim 1, further comprising sending an indication to the calling address recording the voicemail, the indication indicating the voicemail has been retrieved at the global positioning system coordinates describing the retrieval location.

5. The method of claim 1, further comprising receiving a date and a time indicating when the voicemail was retrieved.

6. The method of claim 1, further comprising associating a date and time of retrieval to the global positioning system coordinates describing the retrieval location.

7. The method of claim 1, further comprising receiving a name of a recipient retrieving the voicemail.

8. The method of claim 1, further comprising adding a field to the electronic entry in the electronic communications log, the field including information describing a name associated with the calling address.

9. A system, comprising:
a processor; and
a memory storing code that when executed causes the processor to perform operations, the operations comprising:
receiving an electronic notification indicating a called device associated with a network address has retrieved a voicemail;
receiving an electronic voicemail retrieval icon indicating the voicemail has been retrieved;
receiving global positioning system coordinates associated with the network address, the global positioning system coordinates describing a retrieval location at which the called device retrieved the voicemail;
retrieving an electronic communications log associated with a calling address associated with the voicemail; and
adding an electronic entry to the electronic communications log associated with the calling address, the electronic entry associating the global positioning system coordinates describing the retrieval location to the network address associated with the called device retrieving the voicemail and to the electronic voicemail retrieval icon.

10. The system of claim 9, wherein the operations further comprise sending the voicemail retrieval icon to the calling address.

11. The system of claim 9, wherein the operations further comprise displaying the voicemail retrieval icon in the communications log to indicate the called device retrieved the voicemail at the global positioning system coordinates describing the retrieval location.

12. The system of claim 9, wherein the operations further comprise sending an indication to the calling address associated with the voicemail, the indication indicating the voicemail has been retrieved.

13. The system of claim 9, wherein the operations further comprise receiving a date and a time indicating when the voicemail was retrieved.

14. The system of claim 9, wherein the operations further comprise associating a date and time of retrieval to the global positioning system coordinates describing the retrieval location.

15. The system of claim 9, wherein the operations further comprise receiving a name of a recipient retrieving the voicemail.

16. The system of claim 9, wherein the operations further comprise adding a field to the electronic entry in the electronic communications log, the field including information describing a name associated with the calling address.

17. A memory device storing instructions that when executed cause a processor to perform operations, the operations comprising:
receiving an electronic notification indicating a called device associated with a network address has retrieved a voicemail;
receiving an electronic voicemail retrieval icon indicating the voicemail has been retrieved;
receiving global positioning system coordinates associated with the network address, the global positioning system coordinates describing a retrieval location at which the called device retrieved the voicemail;
retrieving an electronic communications log associated with a calling address associated with the voicemail; and
adding an electronic entry to the electronic communications log associated with the calling address, the electronic entry associating the global positioning system coordinates describing the retrieval location to the network address associated with the called device retrieving the and to the electronic voicemail retrieval icon.

18. The memory device of claim 17, wherein the operations further comprise sending the voicemail retrieval icon to the calling address.

19. The memory device of claim 17, wherein the operations further comprise displaying the voicemail retrieval icon in the communications log to indicate the called device retrieved the voicemail.

20. The memory device of claim 17, wherein the operations further comprise sending an indication to the calling address associated with the voicemail, the indication indicating the voicemail has been retrieved.

* * * * *